(12) United States Patent
Heilmann et al.

(10) Patent No.: US 10,877,471 B2
(45) Date of Patent: Dec. 29, 2020

(54) METHOD AND APPARATUS FOR GENERATING A FAULT TREE FOR A FAILURE MODE OF A COMPLEX SYSTEM

(71) Applicant: Siemens Aktiengesellschaft, Munich (DE)

(72) Inventors: Reiner Heilmann, Egmating (DE); Kai Höfig, Munich (DE)

(73) Assignee: SIEMENS AKTIENGESELLSCHAFT

( * ) Notice: Subject to any disclaimer, the term of this patent is extended or adjusted under 35 U.S.C. 154(b) by 297 days.

(21) Appl. No.: 15/565,729

(22) PCT Filed: Apr. 28, 2015

(86) PCT No.: PCT/EP2015/059170
§ 371 (c)(1),
(2) Date: Oct. 11, 2017

(87) PCT Pub. No.: WO2016/173624
PCT Pub. Date: Nov. 3, 2016

(65) Prior Publication Data
US 2018/0074484 A1    Mar. 15, 2018

(51) Int. Cl.
*G05B 23/02* (2006.01)
*G06F 11/00* (2006.01)
(Continued)

(52) U.S. Cl.
CPC ........... *G05B 23/0248* (2013.01); *G06F 7/38* (2013.01); *G06F 11/008* (2013.01); *G06F 11/3452* (2013.01)

(58) Field of Classification Search
USPC ....... 701/31.8; 702/117, 181, 182, 183, 185; 703/6; 714/26.37, E11.029, E11.157
See application file for complete search history.

(56) References Cited

U.S. PATENT DOCUMENTS

2010/0017167 A1* 1/2010 Duc .................... G05B 23/0251
702/185
2010/0169420 A1* 7/2010 McCoy ............... H04L 12/2807
709/204
(Continued)

OTHER PUBLICATIONS

Domis D et al: "A Consistency Check Algorithm for Component-Based Refinements of Fault Trees",Software Reliability Engineering (ISSRE), 2010 IEEE 21 st International Symposium on, IEEE, Piscataway, NJ, pp. 171-180, XP031801106,ISBN: 978-1-4244-9056-1; 2010.

(Continued)

*Primary Examiner* — John E Breene
*Assistant Examiner* — Jeffrey P Aiello
(74) *Attorney, Agent, or Firm* — Schmeiser, Olsen & Watts LLP

(57) ABSTRACT

A method and apparatus for generating a fault tree for a failure mode of a complex system including a plurality of components, the method includes the steps of providing component fault tree, CFT, elements of the components; linking the components according to their failure dependencies within the complex system; and generating the fault tree by incorporating for each dependency link from a first component to a second component the output failure modes of the component fault tree element of the second component into the component fault tree element of the first component to trigger the output failure modes of the first component.

5 Claims, 5 Drawing Sheets

(51) Int. Cl.
*G06F 7/38* (2006.01)
*G06F 11/34* (2006.01)

(56) References Cited

U.S. PATENT DOCUMENTS

| | | | | |
|---|---|---|---|---|
| 2010/0169713 A1* | 7/2010 | Argue | G05B 23/0248 | 714/25 |
| 2013/0031533 A1* | 1/2013 | Machida | G06F 11/3692 | 717/127 |
| 2013/0073271 A1* | 3/2013 | Xiang | G06F 11/079 | 703/6 |
| 2013/0317780 A1* | 11/2013 | Agarwal | G05B 23/0248 | 702/181 |
| 2015/0067400 A1* | 3/2015 | Ishii | G06F 11/079 | 714/37 |
| 2015/0142402 A1* | 5/2015 | Ramesh | G06F 30/20 | 703/7 |
| 2016/0171506 A1* | 6/2016 | Hofig | G06Q 10/067 | 705/317 |
| 2016/0266952 A1* | 9/2016 | Hofig | G06F 11/0751 | |

OTHER PUBLICATIONS

Bernhard Kaiser et al: "A New Component Concept for Fault Trees",8th Australian Workshop on Safety Critical Systemsand Software (SCS'03), pp. 37-46, XP55206337,Canberra Retrieved from the Internet:URL:http://essarel.de/publications/klm03.pdf; 2003.

Andrew Rae;Peter Linosay: "A Behaviour-Based Method for Fault Tree Generation",Proceeoings of the 22no International System Safety Conference, pp. 289-298, XP002746028,; 2004.

PCT International Search Report and Written Opinion of International Searching Authority dated Nov. 2, 2015 corresponding to PCT International Application No. PCT/EP2015/059170 filed on Apr. 28, 2015.

* cited by examiner

METHOD AND APPARATUS FOR GENERATING A FAULT TREE FOR A FAILURE MODE OF A COMPLEX SYSTEM

CROSS-REFERENCE TO RELATED APPLICATIONS

This application claims priority to PCT Application No. PCT/EP2015/059170, having a filing date of Apr. 28, 2015, the entire contents of both of which are hereby incorporated by reference.

FIELD OF TECHNOLOGY

The following relates to a method and apparatus for generating a fault tree for a failure mode of a complex system comprising a plurality of components, in particular a safety critical complex system.

BACKGROUND

A safety critical system is a system whose failure or malfunction may result in damages of equipment or whose failure or malfunction may result in injuring people. The use of safety analysis models is important during the development of safety critical systems. Safety analysis models can be used to identify drawbacks or insufficiencies in terms of safety. During development, the existing components or units are often reused in identical or slightly changed form to save development time. Changes are made to these components to match the requirements of the designed system. When components are reused during development, the existing safety analysis models are a relevant input for an early safety assessment of the new system, since they already provide a valid data model. Nevertheless, changes and adoptions during the development process of the system can invalidate former analysis models and require adaption of the safety analysis model of the system to the performed changes.

A design of a safety critical system can comprise a probabilistic risk assessment, wherein failure mode and effects analysis can be performed using fault tree analysis. Fault tree analysis offers the decomposition of the system into modules. Fault tree analysis is a deductive procedure used to determine various combinations of hardware and software failures as well as human errors that can cause undesired events referred to as top events at the system level. Complex technical systems can comprise a plurality of hardware and/or software components. An area where the development of safety analysis models is essential are safety critical cyberphysical systems. These cyberphysical systems can consist of more or less loosely coupled embedded systems. The alignment of the embedded systems is unclear at design time and possible configurations at design time are almost infinite. Each embedded system forming part of a cyberphysical system may be reused in many different configurations. For such complex systems, it can be necessary for a safety critical function to be certified at runtime to assure a safe operation of the safety critical system.

However, conventional safety analysis methods do not provide a possibility to divide safety analysis models into different layers and/or domains. Conventional safety analysis methods allow for example not to perform decomposition of the system into a functional layer and a physical layer.

SUMMARY

An aspect relates to providing a method and apparatus for generating a fault tree for a failure mode of a complex system allowing to perform a safety analysis for different layers and/or domains of a complex system.

This object is achieved according to a first aspect by a method for generating a fault tree for a failure mode of a complex system.

Embodiments of the invention provide, according to a first aspect a method for generating a fault tree for a failure mode of a complex system comprising a plurality of components,
said method comprising the steps of:
providing component fault tree elements of the components; linking the components according to their failure dependencies within said complex system and generating said fault tree by incorporating for each dependency link from a first component to a second component the output failure modes of the component fault tree element of the second component into the component fault tree element of the first component to trigger the output failure modes of the first component.

In a possible embodiment of the method according to the first aspect of embodiments of the present invention, the output failure modes of the component fault tree element of the second component are connected automatically to the output failure modes of the component fault tree element of the first component via OR-gates.

In a further possible embodiment of the method according to the first aspect of embodiments of the present invention, the method further comprises selecting an output failure mode of the component fault tree element of a component of interest within the generated fault tree.

In a further possible embodiment of the method according to the first aspect of embodiments of the present invention, the selected output failure mode is a top event of the generated fault tree.

In a still further possible embodiment of the method according to the first aspect of embodiments of the present invention, the generated fault tree is reduced by a Boolean logic to create a reduced fault tree for the selected output failure mode.

In a further possible embodiment of the method according to the first aspect of embodiments of the present invention, the method is performed in a normal operation mode of the complex system during runtime of the complex system.

In a further alternative embodiment of the method according to the first aspect of embodiments of the present invention, the method is performed in a separate operation mode of said complex system, in particular during deployment of components, during configuration or reconfiguration of said complex system and/or during maintenance or repair of said complex system.

In a further possible embodiment of the method according to the first aspect of embodiments of the present invention, the components of the complex system comprise hardware components and/or software components.

In a further possible embodiment of the method according to the first aspect of embodiments of the present invention, the component fault tree elements of the components of said complex system are loaded from a library stored in a database and/or are designed for the components.

In a further possible embodiment of the method according to the first aspect of embodiments of the present invention, the linking of the components according to their failure dependencies is performed automatically using failure dependency indications assigned to the components.

Embodiments of the invention provide, according to the second aspect of the present invention, an apparatus for generating a fault tree for a failure mode of a complex system, said apparatus comprising:

an input interface adapted to input component fault tree elements of components of said complex system, a linking unit adapted to link the components according to their failure dependencies within said complex system and a calculation unit adapted to generate said fault tree by incorporating for each dependency link from a first component to a second component the output failure modes of the component fault tree element of the second component into the component fault tree element of the first component to trigger the output failure modes of the first component.

In a possible embodiment of the apparatus according to the second aspect of embodiments of the present invention, the output failure modes of the component fault tree element of the second component are connected automatically by said calculation unit to the output failure modes of the component fault tree element of the first component via incorporated OR-gates.

In a further possible embodiment of the apparatus according to the second aspect of embodiments of the present invention, the apparatus further comprises a user interface adapted to select an output failure mode of a component fault tree element of a component of interest within the generated fault tree.

In a further possible embodiment of the apparatus according to the second aspect of embodiments of the present invention, the calculation unit is adapted to reduce the generated fault tree by a Boolean logic to create a reduced fault tree for the selected output failure mode.

In a further possible embodiment of the apparatus according to the second aspect of embodiments of the present invention, the apparatus is integrated in the complex system.

In a further possible alternative embodiment of the apparatus according to the second aspect of embodiments of the present invention, the apparatus is connectable to the complex system by means of a communication interface.

BRIEF DESCRIPTION

In the following, possible embodiments of the different aspects of the present invention are described in more detail with reference to the enclosed figures.

DETAILED DESCRIPTION

Figure 1:
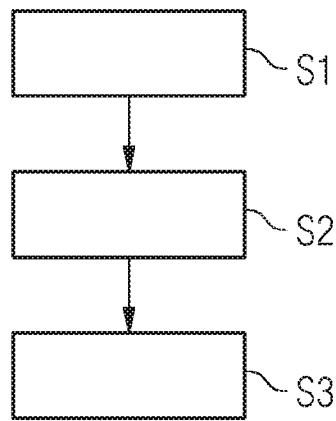
FIG. 1 shows a flowchart of a possible exemplary embodiment of the method for generating a fault tree according to the first aspect of the present invention.
Figure 4:
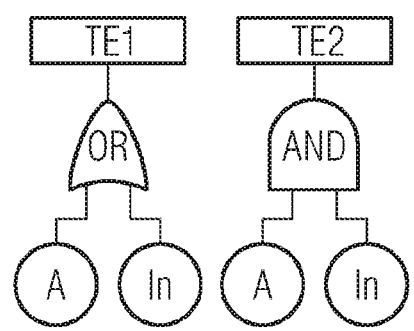
FIGS. 4 and 5 illustrate a conventional fault tree and a component fault tree as employed by the method and apparatus.
Figure 5:
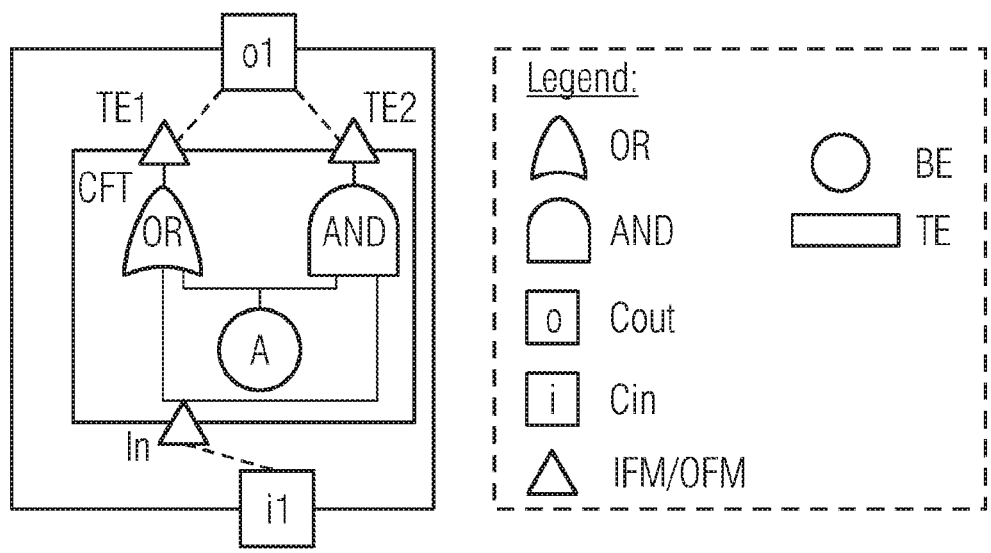
Figure 9:
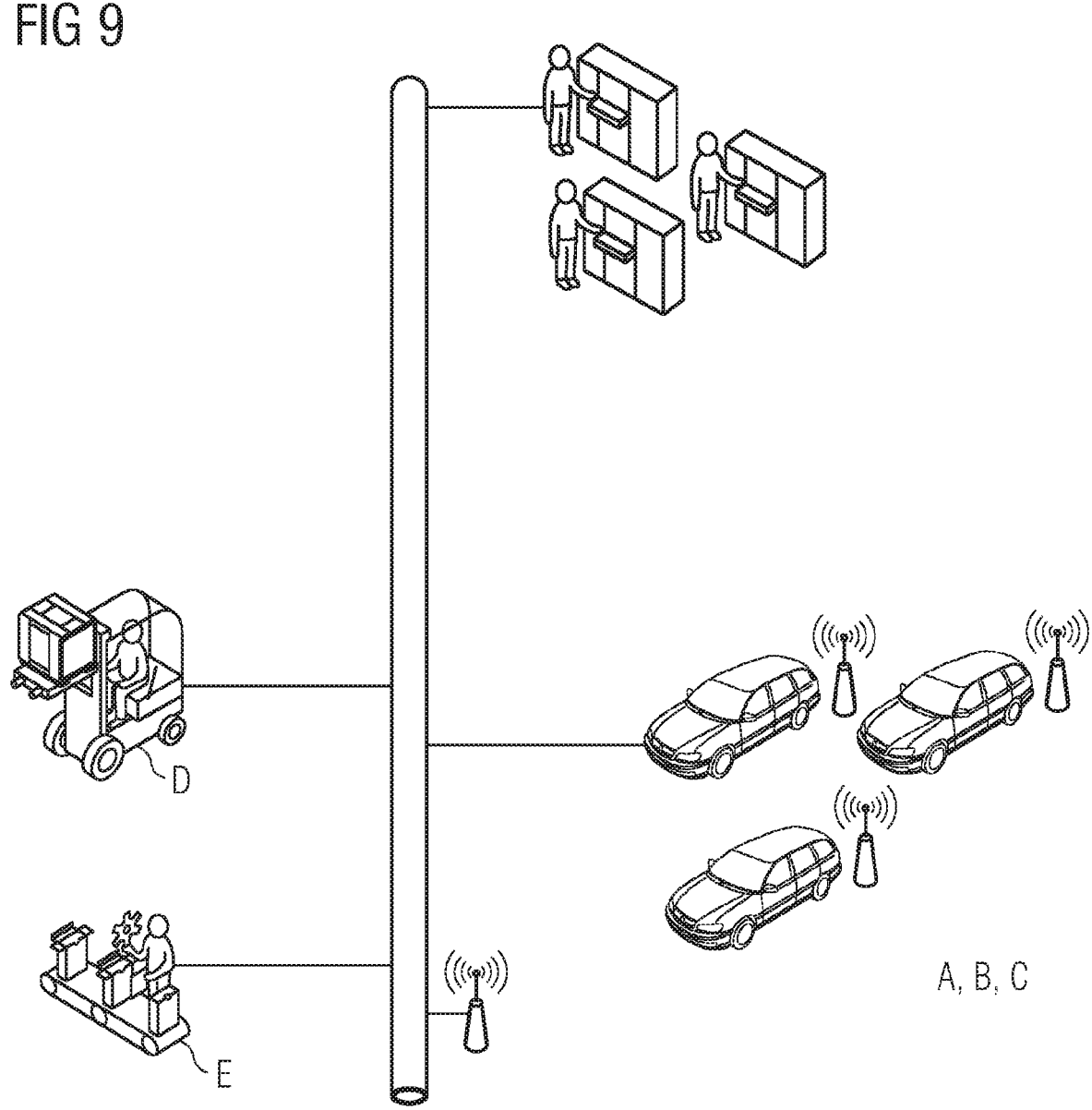
FIG. 9 shows a diagram for illustrating an exemplary cyberphysical system for which a fault tree model can be generated by the method and apparatus according to the present invention.

As can be seen in FIG. 1, the method for generating a fault tree for a failure mode of a complex system comprising a plurality of components c can comprise several steps. The complex system can be a safety critical system SCS, in particular a cyberphysical complex system as illustrated in FIG. 9. The components c can comprise hardware and/or software components. Each component can be represented by a corresponding component fault tree element. The functional safety behaviour of each component c of the system SCS can be represented by an associated component fault tree, CFT, element. A component fault tree CFT is a Boolean data model associated to system development elements such as components. A separate component fault tree element can be related to each component c of the system SCS. Failures that are visible at the outport of a component are modelled using so-called output failure modes, OFM, which are related to this specific outport of the component c. For modelling how specific failures propagate from an inport of a component to the outport, input failure modes, IFMs, are used. The inner failure behaviour within the component c that also influences the output failure modes is modelled using a gate such as NOT, AND, OR Gates and Basic Events BE. FIG. 4 shows a conventional classic fault tree and FIG. 5 shows a corresponding component fault tree CET. In both trees, the top events or output events TE1 and TE2 are modelled. The component fault tree model illustrated in FIG. 5 allows, additionally to the Boolean formulae that are also modelled within the conventional classic fault tree illustrated in FIG. 4, to associate the specific top events to the corresponding ports where these failures can appear. Top event TE1, for example, appears at port O1. Using this methodology of components also within fault tree models, benefits during the development of the complex system can be observed, for example an increased maintainability of the safety analysis model.

In a first step S1 of the method according to an embodiment of the present invention as illustrated in FIG. 1, the component fault tree elements CFTe of the different components within the complex system SCS are provided.

Figure 6:
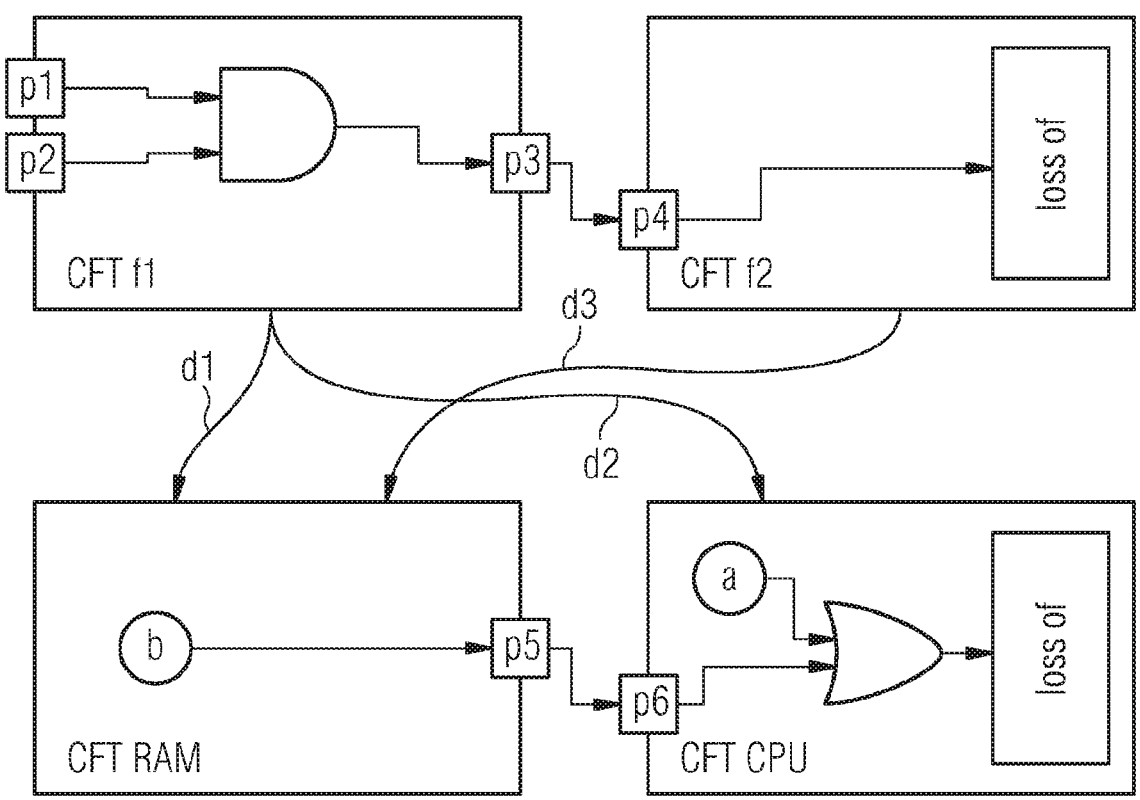
FIG. 6 illustrates an exemplary complex system with two different layers having components represented by corresponding component fault tree elements and linked by failure dependencies.

In a further step S2, the components c are linked according to their failure dependencies d within the complex system SCS. FIG. 6 illustrates an exemplary system with two different layers. In the given example, the safety critical complex system SCS comprises a functional layer comprising functions f1, f2 and a hardware layer comprising two hardware components, i.e. a RAM memory component and a CPU component. In FIG. 6 on the top, the component fault tree elements of the two functions f1 and f2 are depicted. In the given example, function f1 in the upper layer receives two sensor values at its ports p1, p2. If both values are unavailable, the result of the function f1 is unavailable (loss of function) modelled by an AND-gate within the component fault tree element CETe of the first function f1 as shown in FIG. 6. In the same layer, if function f2 receives no signal from function f1, function f2 is not available modelled by the top event TE "loss of" as illustrated in FIG. 6. Both functions f1, f2 build one layer L of the system architecture, i.e. the software or functional layer.

The second illustrated layer consists of two hardware or physical components. The components c represent the memory (RAM) and a computational resource (CPU) of the complex system. The system is in a failure mode (loss of) if either in the CPU a basic event a occurs or if a basic event b occurs in the memory component RAM.

In step S2, the components c are linked according to their failure dependencies d within the complex system. Since the functional failure behaviour is also dependent from failures that occur in the hardware layer, failure dependencies relations can be used to combine both models of the two different layers L. In the given example, first function f1 in the functional layer can only be executed if both components c of the hardware layer, i.e. the memory component RAM and the CPU component are available. This is reflected in FIG. 6 by the dependency relations d1, d2 from the component fault tree element CFTe for function f1 to both component fault tree elements CFTe of the two components in the physical layer, i.e. the CPU component and the RAM component. Further, in the given example, function f2 is only dependent from the correct function of the memory resource RAM and consequently, the failure dependency d3 is only related to the component fault tree element CFTe of the memory component RAM in the physical layer of the complex system. In a possible embodiment, the linking of the components according to their failure dependencies d within the complex system can be done by a domain expert. In an alternative embodiment, the linking of the components is performed automatically using failure dependency indications assigned to the different components c of the complex system.

Figure 7:
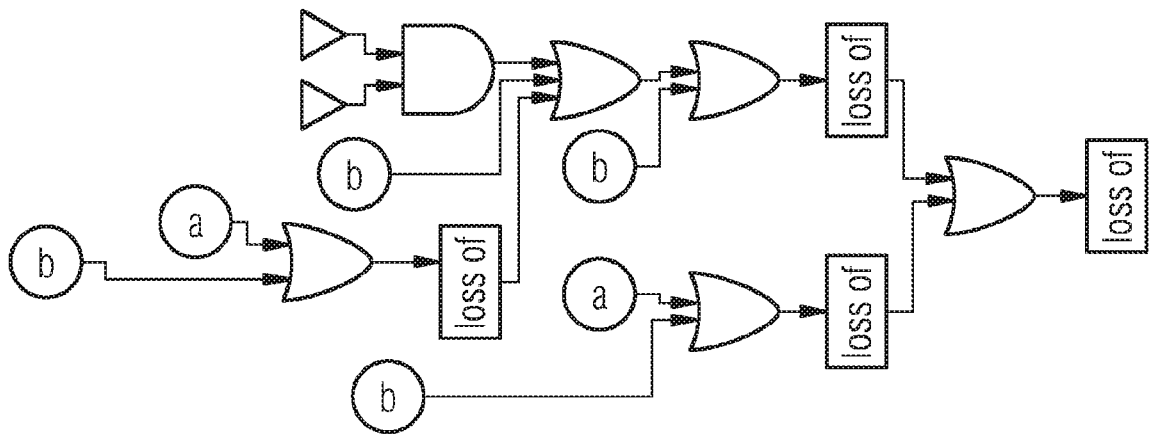
FIG. 7 illustrates a fault tree data model generated by the method and apparatus according to embodiments of the present invention for the exemplary complex system illustrated in FIG. 6.

In a further step S3 of the method as illustrated in the embodiment of FIG. 1, a fault tree is generated by incorporating for each dependency link d from a first component $c_1$ to a second component $c_2$ the output failure modes OFM of the component fault tree element CFTe of the second component $c_2$ into the component fault tree element CFTe of the first component $c_1$ to trigger the output failure modes OFM of the first component $c_1$. In a preferred embodiment, the output failure modes OFMs of the component fault tree elements CFTe of the second component $c_2$ are connected automatically to the output failure modes OFMs of the component fault tree element CFTe of the first component $c_1$ by means of incorporated OR-gates. The resulting generated fault tree model derived from the component fault trees of FIG. 6 is shown in FIG. 7. As can be seen in FIG. 7, the generated fault tree represents the whole complex system including both layers, i.e. the functional layer and the hardware layer.

The set of components of the complex system SCS is:

$C=c_1, \ldots, c_n$ and $CFT=cft_1, \ldots, cft_m \cup \emptyset$ is the set of component fault trees $\tilde{CFT}(c)=cft$ with $c \in C$ and $cft \in CFT$.

Further $IN(c)=in_1, \ldots, in_i$, and $OUT(c)=out_1, \ldots, out_j$, is the in- and outports of a component c $\overline{CON}=\{(out,in)|out \in OUT(c_1 \cup \ldots OUT(c_n), in \in IN(c_1) \cup \ldots \cup IN(c_n)\}$ is the set of all possible port connections and $CON \subseteq \overline{CON}$ is the set of actual port connections modelling the data flow from the outport of a component c to the inport of another component.

Further $$ALFRED(c)=\{x|x=\tilde{CFT}(d), d \in CFT\}$$

defines the set of all failure dependencies of component c to other components. For the example system illustrated in FIG. 6, the previously defined sets are as follows:

$$C=f_1,f_2,RAM,CPU \tag{1}$$

$$IN(f_1)=p_1,p_2 \tag{2}$$

$$IN(f_2)=p_4 \tag{3}$$

$$IN(RAM)=\{\ \} \tag{4}$$

$$IN(CPU)=p_6 \tag{5}$$

$$OUT(f_1)=p_3 \tag{6}$$

$$OUT(f_2)= \tag{7}$$

$$OUT(RAM)=p_5 \tag{8}$$

$$OUT(CPU)=\{\ \} \tag{9}$$

$$CONN=(p_3,p_4),(p_5,p_6) \tag{10}$$

$$ALFRED(f_1)=\{CPU,RAM\} \tag{11}$$

$$ALFRED(f_2)=\{RAM\} \tag{12}$$

$$ALFRED(CPU)=ALFRED(RAM)=\{\ \} \tag{13}$$

Using these sets and relationships, a fault tree model can be generated from the component fault tree elements CFTe and the failure dependencies that reflects the failure behaviour of both architecture layers in a conservative way. For every failure dependency relation, all basic events BE that are included in the component fault tree CFT of the dependency element are added to all failure modes of the dependent component.

If c has a component fault tree, then it is $\tilde{CFT}(c)=cft, cft \neq \emptyset$.

If c has input and output failure modes, it is $IFM(in) \neq \{\ \}$ and $OFM(out) \neq \{\ \}$ for an inport $in \in IN(c)$ and an outport $out \in OUT(c)$. In the example system as depicted in FIG. 6, the input and output failure modes related to the ports are $$OFM(p_1)=\text{loss of} \tag{14}$$

$$OFM(p_2)=\text{loss of} \tag{15}$$

$$OFM(p_3)=\text{loss of} \tag{16}$$

$$IFM(p_4)=\text{loss of} \tag{17}$$

$$IFM(p_5)=\text{loss of} \tag{18}$$

$$IFM(p_6)=\text{loss of} \tag{19}$$

If a component $f_2$ is dependent of the correct function of another component RAM, the failure modes of RAM trigger all failure modes of $f_2$. This is a conservative assumption, which is an overestimation, but simplifies the modelling of dependencies, since there is no need to map single failure modes from RAM to $f_2$. Instead, the failure modes of RAM are added to all failure modes of $f_2$ using an OR-gate. If multiple dependency relations are present, e.g. $f_1$ is dependent from RAM and CPU, all failure modes are included from RAM and CPU into the failure behaviour of $f_1$. This is depicted using elements in FIG. 7. The triangle at the AND-gate mark failure behaviour that is outside the model.

The generated fault tree for the given exemplary complex system is illustrated in FIG. 7.

In a further possible embodiment of the method according to embodiments of the first aspect of the present invention, an output failure mode OFM of a component fault tree element CFTe of a component c of interest within the generated fault tree, such as illustrated in the example of FIG. 7, can be selected.

Figure 2:
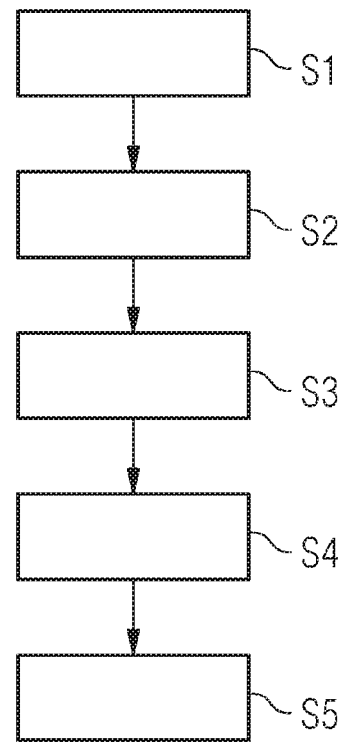
FIG. 2 shows a further flowchart for illustrating a further possible exemplary embodiment of the method for generating a fault tree according to the first aspect of the present invention.
Figure 8:
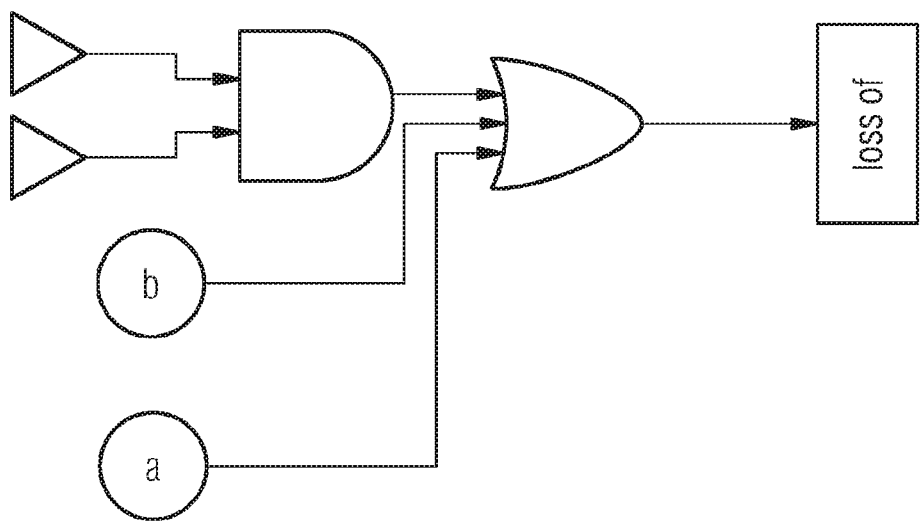
FIG. 8 illustrates the reduced fault tree derived from the generated fault tree model illustrated in FIG. 7.

FIG. 2 shows a flowchart of a possible exemplary embodiment of the method according to the present invention, where a selection takes place in step S4. In step S4, an output failure mode OFM of a component fault tree element CFTe of a component c of interest within the generated fault tree is selected by a user. The selected output failure mode OFM can be for example a top event TE of the generated fault tree. In the exemplary generated fault tree data model as illustrated in FIG. 7, the basic events a and b have been included in the generated fault tree and represent the failure behaviour of the hardware components. Furthermore, the AND-gate illustrated in FIG. 7 represents the failure behaviour of the two redundant sensor values which form part of the software layer. By the method according to embodiments of the present invention, the original safety analysis models for different layers, i.e. a logical or functional layer and a physical layer, are combined for providing a common safety analysis model as illustrated in FIG. 7. After having selected an output failure mode OFM, for example top event "loss of" the generated fault tree can be reduced in step S5 by applying a Boolean logic to create a reduced fault tree for the selected output failure mode as illustrated in FIG. 8.

A component c is dependent from the correct function of other components $c_1, \ldots, c_n$ with $\text{ALFRED}(c)=c_1, \ldots, c_n$ and $\text{OFM}(c_1)$ being the output failure modes of $C_i$ with $$\text{OFM}(c_i)=o_1^i, \ldots, o_m^i.$$

All output failure modes OFM(c) are supplemented with the failure modes of the components in ALFRED(c) to model the failure dependency in a conservative way. The output failure modes $\text{OFM}(c)=o_1, \ldots, o_m$ are replaced by $$\text{OFM}(c)=\overline{o_1}, \ldots, \overline{o_m}$$

with $$\overline{o_j} = o_j \bigvee_{i=1}^{n} o_1^i \vee \ldots \vee o_m^i.$$

Figure 3:
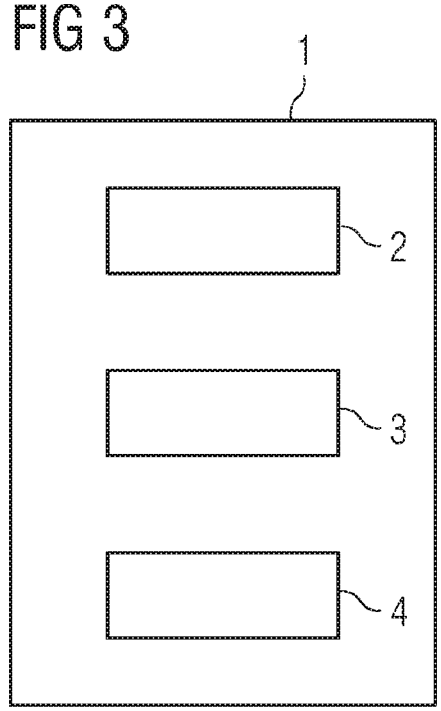
FIG. 3 shows a block diagram for illustrating a possible exemplary embodiment of the apparatus for generating a fault tree according to the second aspect of the present invention.

FIG. 3 illustrates a block diagram of an exemplary embodiment of an apparatus according to the second aspect of the present invention.

The apparatus 1 as illustrated in FIG. 3 is adapted to generate a fault tree for at least one failure mode of a complex system, in particular a safety critical system SCS such as the cyberphysical system illustrated in FIG. 9. The apparatus 1 comprises in the illustrated embodiment an input interface 2 adapted to input component fault elements of components of the investigated complex system. The apparatus 1 further comprises a linking unit adapted to link the components c according to their failure dependencies d within said complex system. In a possible embodiment, the linking of the components c are performed by the linking unit 3 automatically according to failure dependencies using failure dependency indications assigned to the different components c of the complex system.

The apparatus 1 further comprises a calculation unit 4 adapted to generate the fault tree by incorporating for each dependency link d from a first component $c_1$ to a second component $c_2$ the output failure modes OFMs of the component fault tree element CFTe of the second component $c_2$ into the component fault tree element CFTe of the first component $c_1$ to trigger the output failure modes OFMs of the first component $c_1$. In a possible embodiment, the output failure modes OFMs of the component fault tree element CFTe of the second component $c_2$ are connected automatically to the output failure modes OFMs of the component fault tree element CFTe of the first component $c_1$ by means of incorporated OR-gates.

In a further possible embodiment, the apparatus 1 further comprises a user interface which allows a user to select an output failure mode OFMs of a component fault tree element CFTe of a component c of interest within the generated fault tree. For instance, a user can select via the user interface a top event TE of the generated fault tree as an output failure mode OFM. The calculation unit 4 is adapted in a possible embodiment to reduce the generated fault tree by applying a Boolean logic to create a reduced fault tree for the selected output failure mode OFM. The generated fault tree and/or the reduced fault tree can be output to a user by means of a display of the user interface of the apparatus 1. The apparatus 1 as illustrated in FIG. 3 can in a possible embodiment form part of the complex system. In a possible embodiment, the apparatus 1 can be even integrated in the complex system to be investigated. In a further possible embodiment, the apparatus 1 is connectable to the complex system by a communication interface of the complex system.

The apparatus 1 is adapted to perform a method for generating a fault tree for a failure mode of a complex system as illustrated in the flowcharts of FIGS. 1 and 2. In a possible embodiment, the method is performed in a normal operation mode of the complex system during runtime of the complex system. In an alternative embodiment, the method is performed in a separate operation mode of said complex system. For example, the method can be performed during deployment of components c or during configuration or reconfiguration of the complex system and/or during maintenance or repair of the complex system.

The configuration of the complex system includes the addition of components, the replacement of components or removal of the components. Further, configuration or reconfiguration comprises the change of dependencies between different components of the complex system. By evaluating the generated fault tree, it is possible to verify, whether a configuration or reconfiguration of the system is admissible or system critical.

FIG. 9 illustrates an exemplary cyberphysical system comprising different subsystems and/or components c. All subsystems can possibly interact with each other, for example via a cable or wireless connection and can execute the same function on different hardware platforms. If one of these functions migrates to another subsystem, e.g. subsystem B uses autonomous driving from subsystem D, this might require a recertification of the safety analysis model on the different hardware. If the information is present which part of the function of system D runs on which parts of the hardware of system B, the safety analysis models from system B and system D can be combined using the method or apparatus according to embodiments of the present invention to certify whether the resulting system is performing its functions with the required quality in terms of functional safety.

Another example for using the method and apparatus 1 according to embodiments of the present invention is the deployment of components, in particular software components, on an existing hardware platform comprising a plurality of different hardware components. For instance, the method and apparatus 1 can be used during deployment of software components in a complex system such as a vehicle or car comprising a plurality of components communicating with each other, for instance via a data or control bus. A further use case is a safety analysis after two physical subsystems have been coupled with each other. For example, if two train sections are coupled to each other to form a train, the method and apparatus 1 can perform a safety analysis of the created complex system, i.e. train. For instance, the apparatus 1 as illustrated in FIG. 3 can be connected to a system bus of the train. In a possible embodiment, the method is performed in the background during runtime of the investigated complex system. In a possible embodiment, the generated safety analysis results can be output to a user or a central control unit. Depending on the safety analysis results, it can be decided, whether the investigated system is safe or safety critical. If the safety analysis is performed during runtime of the safety critical system, in a possible embodiment the system may be shutdown or deactivated automatically if the safety analysis indicates that the investigated system cannot be operated safely.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method for generating a fault tree for a failure mode of a complex system comprising a plurality of components, wherein the components comprise both hardware components and software function components, said method being performed in a normal operation mode of the complex system during runtime of the complex system and comprising:
   (a) providing, to an apparatus, component fault tree elements of the plurality of components, wherein the component fault tree elements of the plurality of components include a hardware layer and a software function layer;
   (b) linking, by an apparatus, the components according to their failure dependencies within said complex system, wherein at least one software function component in the software function layer is linked to at least one hardware component in the hardware layer; and
   (c) generating, by the apparatus, said fault tree by incorporating for each dependency link from a first component to a second component the output failure modes of the component fault tree element of the second component into the component fault tree element of the first component to trigger the output failure modes of the first component, such that at least one of the following occurs:
      at least one output failure mode from the software function layer is incorporated into at least one output failure mode of the hardware layer, and
      at least one output failure mode from the hardware layer is incorporated into at least one output failure mode of the software function layer,
   wherein the output failure modes of the component fault tree element of the second component are connected automatically to the output failure modes of the component fault tree element of the first component via OR-gates; and
   (d) receiving, via a user interface, a selection of an output failure mode of a component fault tree element of a component of interest within the generated fault tree, wherein the selected output failure mode is a top event of the generated fault tree, wherein the generated fault tree is reduced by a Boolean logic to create a reduced fault tree for the selected output failure mode, which is output to the user via the user interface.

2. The method according to claim 1, wherein the component fault tree elements of the components of said complex system are loaded from a library stored in a database and/or designed for the components.

3. The method according to claim 1, wherein the linking of the components according to their failure dependencies is performed automatically using failure dependency indications assigned to said components.

4. An apparatus for generating a fault tree for a failure mode of a complex system, said apparatus comprising:
   (a) an input interface adapted to input component fault tree elements of components of said complex system, wherein the components comprise both hardware components and software function components, and wherein the component fault tree elements are organized into a hardware layer and a software function layer;
   (b) a linking unit coupled to the complex system and adapted to link the components according to their failure dependencies within said complex system, wherein at least one software function component in the software function layer is linked to at least one hardware component in the hardware layer;
   (c) a calculation unit coupled to the complex system and adapted to generate said fault tree by incorporating for each dependency link from a first component to a second component the output failure modes of the component fault tree element of the second component into the component fault tree element of the first component to trigger the output failure modes of the first component, such that at least one of the following occurs:
      at least one output failure mode from the software function layer is incorporated into at least one output failure mode of the hardware layer, and
      at least one output failure mode from the hardware layer is incorporated into at least one output failure mode of the software function layer,
   wherein the output failure modes of the component fault tree element of the second component are connected automatically to the output failure modes of the component fault tree element of the first component via OR-gates; and
   (d) a user interface adapted to select and output an output failure mode of a component fault tree element of a component of interest within the fault tree generated by said calculation unit, wherein the calculation unit is adapted to reduce by a Boolean logic a generated fault tree to create a reduced fault tree for the selected output failure mode.

5. The apparatus according to claim 4, wherein the apparatus is integrated in said complex system or connectable to the complex system by a communication interface.

\* \* \* \* \*